March 11, 1924.

E. R. DIEMER ET AL 1,486,128

ON-AND-OFF WEIGHING SCALE

Filed Nov. 20, 1920    2 Sheets-Sheet 1

INVENTORS
L. A. Osgood
and
Earl R. Diemer
By
Kerr Page Cooper & Hayward
ATTORNEYS March 11, 1924.

E. R. DIEMER ET AL 1,486,128

ON-AND-OFF WEIGHING SCALE

Filed Nov. 20, 1920

INVENTOR
L. A. Osgood,
Earl R. Diemer
BY
Kerr Page Cooper + Hayward
ATTORNEYS

Patented Mar. 11, 1924.

1,486,128

UNITED STATES PATENT OFFICE.

EARL R. DIEMER, OF PITTSBURGH, PENNSYLVANIA, AND LOUIS A. OSGOOD, OF DAYTON, OHIO, ASSIGNORS TO INTERNATIONAL SCALE COMPANY, OF DAYTON, OHIO, A CORPORATION OF ILLINOIS.

ON-AND-OFF WEIGHING SCALE.

Application filed November 20, 1920. Serial No. 425,418.

*To all whom it may concern:*

Be it known that we, EARL R. DIEMER and LOUIS A. OSGOOD, citizens of the United States of America, residing at Pittsburgh, in the county of Allegheny, in the State of Pennsylvania, and Dayton, in the county of Montgomery and State of Ohio, have invented certain new and useful Improvements in On-and-Off Weighing Scales, of which the following is a full, clear, and exact description.

This invention relates to improvements in scales and more particularly to scales used in operations where successive amounts of commodities are "weighed off" or "on" the scale.

The general objects of the present invention may be best understood by an explanation of one use to which scales of this type are applied.

In oil and paint factories it is the common practice to blend oils by adding a definite weight of one oil to a definite weight of another. The ordinary method of carrying out this operation is to place a tank upon a scale platform and to take a reading of the scale with a certain amount of oil therein. If the operator desires to draw off from the tank 111 pounds of oil he will then mentally subtract the 111 pounds from the scale reading, and with this subtracted result in mind, draw off oil from the tank until the scale pointer stands over the new amount. Weighing-on operations are conducted in a similar manner. While these operations are fairly satisfactory for even amounts, errors are likely to occur due to mistakes in subtraction when uneven amounts are added or subtracted, and at best the operation is a time-consuming one.

It is among the objects of the present invention to provide a scale in which all mental subtracting operations are avoided and in which direct readings of amounts drawn off or added may be secured from the scale itself.

While the scale is particularly adaptable to operations involving the handling of fluids it is not limited in that respect.

Figure 2:
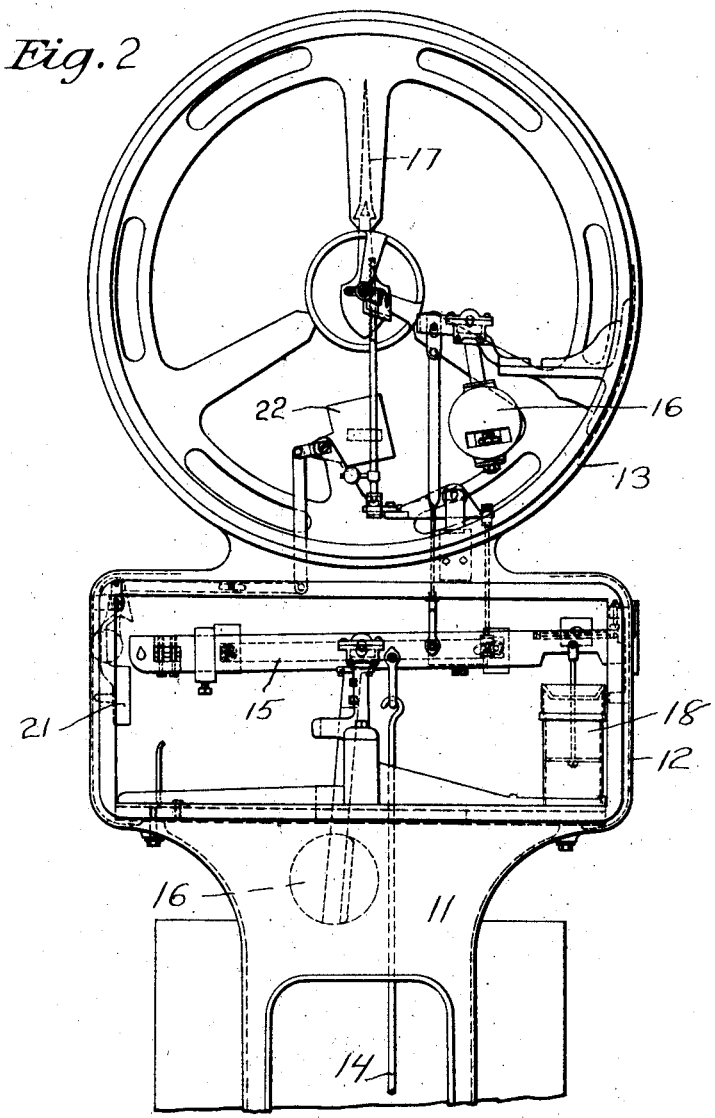
Fig. 2 shows a rear view with the cover plates removed to show the interior working parts of the scale.
Figure 3:
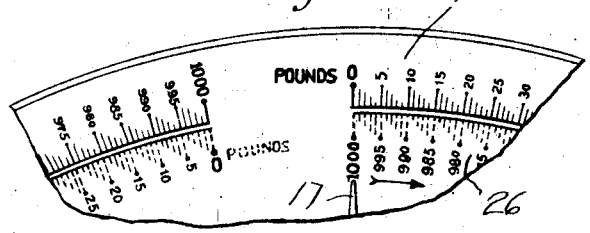
Fig. 3 shows an enlarged view of the complementary dials.

The general features of the scale are well known in the art. It comprises a platform 10, a pedestal 11, a lever housing 12 and a dial housing 13. The platform is connected through the usual base lever system to a steel-yard 14 (Fig. 2) which connects with a fulcrumed beam 15. The load is automatically counterbalanced in any desired manner, as by pendulums 16. The amount of weight thus counterbalanced is indicated by a pointer 17 which is turned by a pinion and rack connected in a suitable manner to the scale beam. Oscillations of the beam are damped by a dash pot 18. When the applied load exceeds the indicating capacity of the scale dial 19, further load may be weighed and the result read by throwing over a handle 20 and depositing the capacity weight 21 upon the scale beam. The amount of capacity weight applied is indicated on a shutter 22 through a window 23.

Attached to the main scale beam is a tare beam 24 provided with a sliding poise 25. The beam may be graduated or not as desired. Usually for straight weighing "on" and "off" operations the graduations on the tare beam would be omitted and if it were desired to use the scale for ordinary weighing operations where tare had to be taken account of the beam would be graduated in a reverse order to that shown. The reversed showing illustrated is here employed for simplicity of explanation in connection with the weighing on or off operations.

The above general features of construction are well known in the art and are more particularly described in co-pending application of L. A. Osgood, Serial No. 105,903, filed June 26, 1916.

In order to provide for weighing on and off operations, we provide two dials 19 and 26. The graduation lines on both these dials coincide and extend in proximity to the tip of pointer 17. The figures on the dials are complementary to each other and the figures for one dial run in a reverse direction to those of the complementary dial. 0 on dial 19 coincides with 1000 on dial 26 and 0 on 26 aligns with 1000 on 19, 300 on 26 with 700 on 19, etc. Preferably the dials 19 and 26 are printed in some contrasting manner as by different-colored inks.

Figure 1:
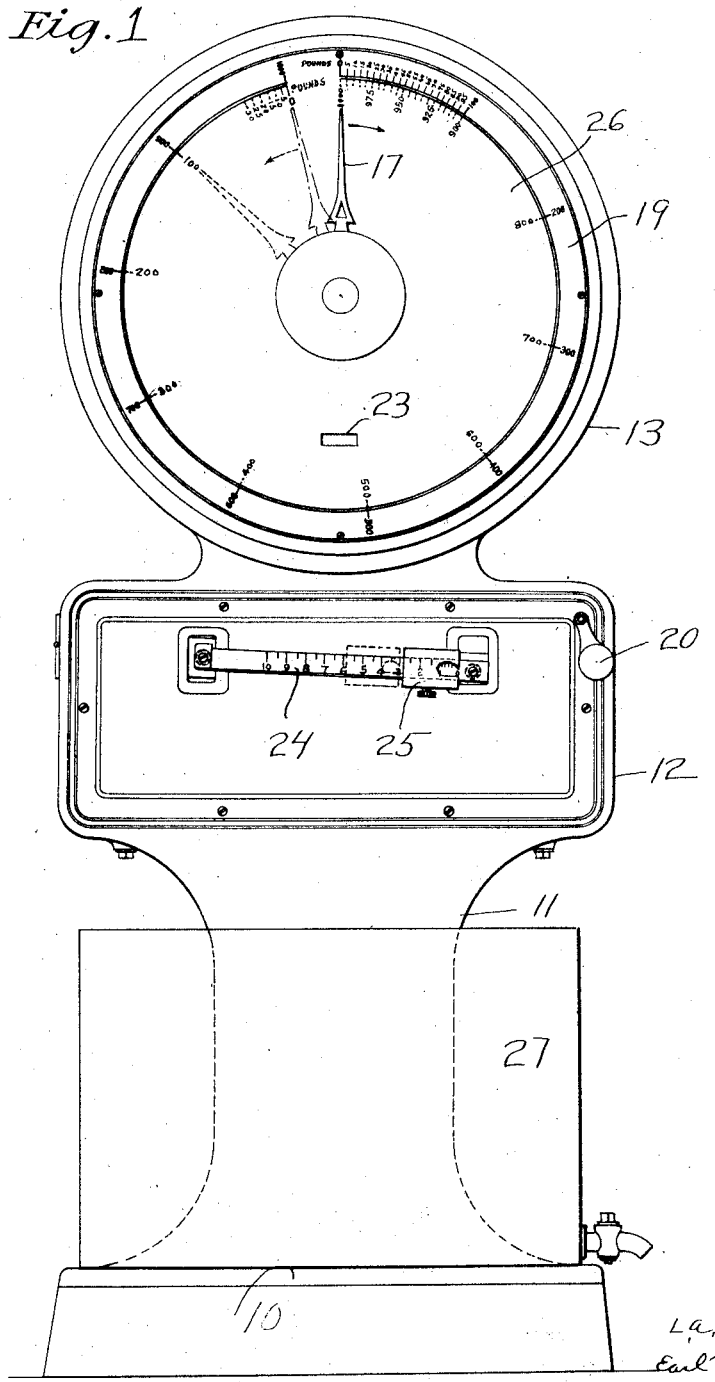
Figure 1 shows a front view of the scale.

With ordinary scales of the type described, the normal position of the tare poise 25 is to the left on beam 24 (Fig. 1) and additional counterbalancing effect is attained by sliding the poise to the right. In the present embodiment the normal position of the tare poise is to the extreme right and the scale is sealed so as to be in balance at 0 with the poise in this position. With this arrangement of parts, a displacement of poise 25 to the left on beam 24 causes the tare weight to act cumulatively with the load upon the scale upon the pendulum automatic counterbalancing system. For example, suppose there is 500 pounds load upon the platform and poise 25 to be upon the extreme right. Pointer 17 would indicate 500 pounnds on dial 19. If, however, the poise were shifted to the left to the 5 mark on the beam the pointer 17 would indicate 1000 on dial 19.

It will be assumed that the weight of oil in the tank 27 (upon platform 10) and of the tank itself is 700 pounds. Suppose it be desired to draw off 100 pounds of oil. The first operation of the operator would be to shift the tare poise to the left until the pointer 17 had swung to the 1000 mark on dial 19 (0 on dial 26). He then opens the valve in the tank and watches the pointer 17 swing over dial 26 and when the pointer reaches the 100 mark on the dial the valve in the tank would be closed.

If it were then desired to draw off an additional amount, he would again move the poise 25 to the left sufficiently to restore the pointer to 0 on scale 26 and the drawing-off operation could then be repeated. This sequence of operations could be repeated until the liquid was exhausted.

Should it be desired to handle amounts in excess of 1000 pounds, the capacity weight device would be utilized in the usual manner.

The scale just described can also be utilized as an ordinary weighing scale. With the poise 25 to the right the dial 19 would be read for weighing operations not involving tare. For weighing operations involving tare the tare poise would be displaced to the extreme left and the capacity weight applied. The capacity weight would then exactly counterbalance the tare weight and the scale pointer would stand at 0 on dial 19. Tare would then be taken off in the usual manner by shifting the tare poise from left to right. Readings would be taken from the outer dial 19.

Another use of the scale would be in operations in which load is both accumulated and discharged. In accumulating the load, each charge can be weighed and in discharging each discharge can be weighed.

With operations of this sort the operator will shift the poise to the extreme left hand position and balance the scale by applying the capacity weight. With the scale in this condition the load can be accumulated. After each charge the reading is taken on dial 19. Thereafter by moving the poise out to the right the pointer can be restored to zero on scale 19 and another load accumulated and the weight read. When the load is complete, by removing the capacity weight from the beam there will always be sufficient latitude in the poise movement to over-balance the hand or pointer 17 to zero on dial 26. Draughts can now be drawn off and individual amounts read on scale dial 26 as heretofore explained.

We claim:

1. In a weighing scale, in combination with a scale beam, automatic counterbalancing means and a movable weight indicating device, of fixed complementary dials cooperating with the indicating device and a supplemental manually operable counterpoise arranged to act cumulatively with the load to shift the indicating device towards the zero of one dial and away from the zero of the other dial.

2. In a weighing scale, in combination with a scale beam, a connected load support, an automatic counterbalancing means, a movable weight indicator connected with the beam, of fixed complementary dials cooperating with the weight indicator of a counterpoise means arranged to act cumulatively with the load upon the automatic counterbalancing means when the counterpoise is displaced, whereby with any given load the indicator may be brought to the zero of the complementary dial.

3. In a weighing scale, in combination with a scale beam, a connected load support, an automatic counterbalancing means, a weight indicator movable in unison with the beam, a pair of fixed complementary dials cooperating with the weight indicator, and supplemental counterbalancing means arranged to balance the scale at 0 of one dial when in one position and to balance the scale at 0 of the complementary dial when in another position.

4. The invention set forth in claim 3 in which the supplemental counterbalancing means comprises a manually shiftable poise.

5. The invention set forth in claim 3 in which the supplemental counterbalancing means comprises a manually shiftable poise member supplemented by a capacity weight device, said latter device being brought into operation when the load exceeds the capacity of the poise member.

6. In a weighing scale, in combination with a scale beam, a connected load support, an automatic counterbalancing means, a weight indicator movable in unison with the beam, a pair of fixed dials cooperating with the weight indicator, said dials being reversely arranged with the figures designating the graduations complementary to each other; a counterpoise and beam therefor connected with the scale beam, said counterpoise when in one position on its beam being adapted to bring the scale indicator to zero balance with respect to one dial and when in the opposite position bringing the scale indicator to zero balance with respect to the complementary dial.

7. The invention set forth in claim 6, in which a capacity weight device is provided with provisions for removing or applying a capacity weight to the scale beam, said capacity weight when applied operating cumulatively with the counterpoise when the latter is in one position and negatively thereto when in its opposite position.

In testimony whereof we hereto affix our signatures.

EARL R. DIEMER.
LOUIS A. OSGOOD.

Witnesses:
 FELIX THOMAS,
 J. M. FINCH.